Patented Aug. 9, 1949

2,478,666

UNITED STATES PATENT OFFICE 2,478,666

PRODUCTION OF FLUORINE-CONTAINING HYDROCARBON DERIVATIVES

Norman Francis Sarsfield, Runcorn, England, assignor to Imperial Chemical Industries Limited, a corporation of Great Britain No Drawing. Application October 10, 1946, Serial No. 702,371. In Great Britain October 26, 1945

10 Claims. (Cl. 260—651)

This invention relates to improvements in the production of fluorine-containing hydrocarbon derivatives.

A number of processes are known whereby fluorine-containing hydrocarbon derivatives are obtained by reacting a chlorinated hydrocarbon with fluorine, a fluorinating agent such as cobalt trifluoride or silver difluoride, or with hydrogen fluoride in the presence of a catalyst. Thus chlorinated kerosene, chlorinated cyclohexane, chlorobenzotrifluorides may be treated with fluorine in either the liquid phase or the gaseous phase to produce a liquid product in which at least the majority of the chlorine and hydrogen atoms have been replaced by fluorine atoms. It is even possible by these methods to produce fluorocarbons, that is, compounds containing only fluorine and carbon. Usually, however, it is a matter of some difficulty to obtain compounds completely free from chlorine and hydrogen even on treatment with such a vigorous reactant as elementary fluorine. The product which results is thus a highly fluorinated fluorochlorohydrocarbon. Similar compounds may also be produced by treating a hydrocarbon or partially fluorinated hydrocarbon, for example benzotrifluoride, with fluorine while dissolved in a highly chlorinated hydrocarbon such as pentachloroethane. It appears that partial decomposition of the solvent occurs with fission of chlorine, which in part combines with the material being fluorinated. Attempts to increase the fluorine content of such compounds by the usual methods usually results in cracking.

We have now found that chlorine can be removed from a highly fluorinated fluorochlorohydrocarbon by subjecting it to the action of a dehydrochlorinating agent. We have further found that products with a higher degree of fluorination than the starting material can be obtained without causing cracking by treating the fluorinated body resulting from the dehydrochlorination treatment with a fluorinating agent.

According to the present invention, therefore, a process for increasing the degree of fluorination of a highly fluorinated fluorochlorohydrocarbon comprises subjecting a highly fluorinated fluorochlorohydrocarbon to the action of a dehydrochlorinating agent, and treating the resulting unsaturated body with fluorine, cobalt trifluoride or silver difluoride.

It is possible, in general, by subjecting the highly fluorinated fluorochlorohydrocarbon to the action of a dehydrochlorinating agent, to remove the elements of hydrogen chloride without removing the fluorine atoms to any marked degree, thereby leaving an unsaturated body which will add on fluorine to give a more highly fluorinated body than the original highly fluorinated fluorochlorohydrocarbon.

A number of reagents are known to have the power of removing the elements of hydrogen chloride from organic chloro-bodies, and are thus known as dehydrochlorinating agents. They include, for example, the caustic alkalies, either in an anhydrous condition or dissolved in water or a lower aliphatic alcohol. Any of these reagents may be used in the method of the present invention. Alcoholic caustic alkalies are particularly suitable for the process since the fluorochlorohydrocarbons are soluble in these reactants and the reaction thus proceeds more smoothly.

The dehydrochlorination process may be carried out by heating the fluorochlorohydrocarbon and the dehydrochlorinating agent together. Thus the fluorochlorohydrocarbon may be mixed with lime, soda lime, or sodium hydroxide, and the mixture distilled, whereby reaction will proceed and the unsaturated body will distil over. Alternatively the fluorochlorohydrocarbon may be warmed with an excess of a solution of caustic soda in ethyl alcohol, and the product recovered by adding water and thus causing it to form a separate layer which can be isolated, washed with water, and dried.

The fluorination of the resultant unsaturated compound may be brought about by passing gaseous fluorine into it either in the presence or absence of an inert diluent, by heating it with cobalt trifluoride or silver difluoride, or by passing the vapours of the compound over cobalt trifluoride at a temperature of 320° C. to 370° C.

The invention is particularly valuable as applied to the treatment of highly fluorinated fluorochlorohydrocarbons which are normally liquid, for example those whose molecules contain carbon skeletons of 6 to 15 carbon atoms; such liquids are those obtained by the fluorination of benzotrifluoride and other fluorinated benzene homologues by treatment with fluorine while dissolved in a highly chlorinated solvent such as pentachloroethane.

The following example illustrates but does not limit the invention. The term "degree of fluorination" or "degree of chlorination" in this example means the proportion, expressed as a percentage, of the number of fluorine (or chlorine) atoms in the molecule to the number of hydrogen atoms in a saturated hydrocarbon with the same carbon skeleton. Other percentages, except where otherwise stated are by weight.

The values given below for these constants were obtained by a refractometric method which makes it difficult to assess the contribution to the refractivity of any double bonds which may be present and thus may overestimate the degree of chlorination.

*Example 1*

A highly fluorinated fluorochlorohydrocarbon was made by passing fluorine, diluted with nitrogen, into a solution of benzotrifluoride in pentachloroethane maintained at 60° C. until reaction became very slow, and then submitting the product to fractional distillation so as to isolate a fraction boiling in the range 240° C. to 260° C. It had a degree of fluorination of 46% and a degree of chlorination of 14%.

The fluorochlorohydrocarbon obtained as above was distilled with excess milk of lime. A 40% yield of product of boiling range 200° C. to 240° C. was obtained having a degree of fluorination equal to 45%, and a degree of chlorination of 12%.

The product was heated for 2 hours with half its weight of silver difluoride and then distilled. The product was collected in two fractions, one boiling below 240° C. and the other boiling above 240° C. The former had a degree of fluorination of 67%, and of chlorination 10%; the latter had a degree of fluorination of 67% and a degree of chlorination of 8%.

Treatment of the original fluorochlorohydrocarbon with silver difluoride without any intermediate treatment with lime gave a 50% yield of product with a degree of fluorination 53% and of chlorination 11%.

I claim:

1. A process for increasing the degree of fluorination of a highly fluorinated fluorochlorohydrocarbon containing from 6 to 15 carbon atoms in the molecule and obtained by fluorinating a fluorinated benzene homologue in the presence of a highly chlorinated solvent, which comprises heating said highly fluorinated fluorochlorohydrocarbon with a dehydrochlorinating agent, and reacting the resulting unsaturated body with a fluorinating agent selected from the group consisting of fluorine, cobalt trifluoride and silver difluoride.

2. A process according to claim 1 in which the dehydrochlorination is effected by distilling the said highly fluorinated fluorochlorohydrocarbon with a dehydrochlorinating agent selected from the group consisting of lime, soda-lime and sodium hydroxide.

3. A process according to claim 1, in which the dehydrochlorination is effected by warming the said highly fluorinated fluorochlorohydrocarbon with excess of a solution of caustic alkali in a lower aliphatic alcohol.

4. A process for increasing the degree of fluorination of a highly fluorinated fluorochlorohydrocarbon containing from 6 to 15 carbon atoms in the molecule and obtained by fluorinating a fluorinated benzene homologue in the presence of a highly chlorinated solvent which comprises heating said highly fluorinated fluorochlorohydrocarbon with a dehydrochlorinating agent, and passing gaseous fluorine into the resulting unsaturated body.

5. A process according to claim 4, in which the dehydrochlorination is effected by distilling the said highly fluorinated fluorochlorohydrocarbon with a dehydrochlorinating agent selected from the group consisting of lime, soda-lime and sodium hydroxide.

6. A process according to claim 4, in which the dehydrochlorination is effected by warming the said highly fluorinated fluorochlorohydrocarbon with excess of a solution of caustic alkali in a lower aliphatic alcohol.

7. A process for increasing the degree of fluorination of a highly fluorinated fluorochlorohydrocarbon containing from 6 to 15 carbon atoms in the molecule and obtained by fluorinating a fluorinated benzene homologue in the presence of a highly chlorinated solvent which comprises heating said highly fluorinated fluorochlorohydrocarbon with a dehydrochlorinating agent and passing the resulting unsaturated body as vapour over cobalt trifluoride at a temperature of 320° C. to 370° C.

8. A process according to claim 7 in which the dehydrochlorination is effected by distilling the said highly fluorinated fluorochlorohydrocarbon with a dehydrochlorinating agent selected from the group consisting of lime, soda-lime and sodium hydroxide.

9. A process according to claim 7 in which the dehydrochlorination is effected by warming the said highly fluorinated fluorochlorohydrocarbon with excess of a solution of caustic alkali in a lower aliphatic alcohol.

10. A process for increasing the degree of fluorination of highly fluorinated fluorochlorohydrocarbon containing from 6 to 15 carbon atoms in the molecule and obtained by fluorinating benzotrifluoride in a highly chlorinated hydrocarbon solvent, which comprises distilling the said highly fluorinated fluorochlorohydrocarbons with milk of lime and heating the distillate with silver difluoride.

NORMAN FRANCIS SARSFIELD.

REFERENCES CITED

The following references are of record in the file of this patent:

UNITED STATES PATENTS

| Number | Name | Date |
|---|---|---|
| 2,344,061 | Renoll | Mar. 14, 1944 |
| 2,399,024 | Harmon | Apr. 23, 1946 |

OTHER REFERENCES

Henne et al. (A) Jour. Am. Chem. Soc. vol 58, 402–3 (1936).

Henne et al. (B) Jour. Am. Chem. Soc. vol. 67, 1639–40 (1945).

Bockemuller, Annalen der Chem. vol. 506, 50–52 (1933).

Ruff et al., Zeit. Anorg. Chem. vol. 183, 196-5 (1929).